US011042526B2

(12) United States Patent
Sirajuddin et al.

(10) Patent No.: US 11,042,526 B2
(45) Date of Patent: Jun. 22, 2021

(54) SYSTEMS AND/OR METHODS FOR DATABASE STORAGE USING BINARY LARGE OBJECTS TO GUARANTEE REDUCED COMPLEXITY

(71) Applicant: Software AG, Darmstadt (DE)

(72) Inventors: Nasiruddin Sirajuddin, Bangalore (IN); Nisha Sridhar, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 267 days.

(21) Appl. No.: 16/144,334

(22) Filed: Sep. 27, 2018

(65) Prior Publication Data
US 2020/0104387 A1   Apr. 2, 2020

(51) Int. Cl.
*G06F 16/22* (2019.01)
*G06F 16/23* (2019.01)
*G06F 16/25* (2019.01)
*G06F 16/21* (2019.01)

(52) U.S. Cl.
CPC ........ *G06F 16/2219* (2019.01); *G06F 16/211* (2019.01); *G06F 16/23* (2019.01); *G06F 16/25* (2019.01)

(58) Field of Classification Search
None
See application file for complete search history.

(56) References Cited

U.S. PATENT DOCUMENTS

| 6,035,303 | A * | 3/2000 | Baer | G06F 16/289 |
| 2008/0021914 | A1 * | 1/2008 | Davies | G06F 16/221 |
| 2011/0320401 | A1 * | 12/2011 | Mahajan | G06F 16/27 707/614 |
| 2013/0151534 | A1 * | 6/2013 | Luks | G06F 16/71 707/742 |
| 2017/0371582 | A1 * | 12/2017 | Chrysanthakopoulos | G06F 16/245 |
| 2019/0018614 | A1 * | 1/2019 | Balko | G06F 3/0604 |
| 2019/0207884 | A1 * | 7/2019 | Kozhemiak | H04L 51/046 |

OTHER PUBLICATIONS

Wikipedia—Data Structure, retrieved Sep. 27, 2018, 5 pages. https://en.wikipedia.org/wiki/Data_structure.
Integers Float, retrieved Sep. 27, 2018, 2 pages. https://processing.org/examples/integersfloats.html.

(Continued)

*Primary Examiner* — Christopher J Raab
(74) *Attorney, Agent, or Firm* — Nixon & Vanderhye PC

(57) ABSTRACT

Certain example embodiments involve accessing data in a database. At least one key is associated with the data. The data is indexed based on the at least one key. The index provides key-value pairs in which keys in the key-value pairs correspond to the at least one key associated with the data and values in the key-value pairs correspond to deserializable serialized blobs generated to include the data in variant data type format. The variant data type format includes different possible equivalent representations of the data such that the data stored in the blobs is of potentially different structures. Responsive to a request received from a computing device, a database transaction is performed on the data in connection with the index and based on the received request. These techniques can be used in connection with tasks as well as data "per se." O(1) performance is achievable in some instances.

25 Claims, 12 Drawing Sheets

(56) References Cited

OTHER PUBLICATIONS

Merriam-Webster: Definition of Database, retrieved Sep. 27, 2018, 9 pages. https://www.merriam-webster.com/dictionary/database.
Wikipedia—Database Index, retrieved Sep. 27, 2018, 8 pages. https://en.wikipedia.org/wiki/Database_index.
Wikipedia—Reverse Index, retrieved Sep. 27, 2018, 2 pages. https://en.wikipedia.org/wiki/Reverse_index.
Apache Thrift, retrieved Sep. 27, 2018, 3 pages. https://thrift.apache.org/.
Message Pack, retrieved Sep. 27, 2018, 3 pages. https://msgpack.org/index.html.
Gnome Developer, retrieved Sep. 27, 2018, 59 pages. https://developer.gnome.org/glib/stable/glib-GVariant.html.

\* cited by examiner

```
struct task_s {
    task_t task_base;
    char id[MAX_TASKID_LEN + 1];
    char name[MAX_TASKID_LEN + 1];
    char type[MAX_TASKID_LEN + 1];
    char creator_id[MAX_CREATOR_ID_LEN_INT + 1];
    char software_id[MAX_SOFTWARE_ID_LEN_INT + 1];
    task_state_t state;
    uint32_t cond;
    uint32_t events;
    trigger_list_t *trigger_list;          ====> Array of triggers
    trigger_list_t *dispose_list;
    uint16_t retry_count; // error retry_count
    uint16_t retry_interval;
    task_exec_status_t exec_status; //task executor will update this state
    task_repeat_policy_t repeat;
    uint16_t max_run_time;//minutes
    uint16_t max_run_time_limit;//minutes
    uint16_t missed_interval;
    void *reserved;
};
struct trigger_s {
    trigger_state_t state;
    char id[MAX_TRIGGERID_LEN + 1];
    task_time_t begin_date;
    task_time_t last_fire_date;
    task_time_t next_fire_date;
    task_time_t last_next_fire_date
    task_time_t end_date;
};
```

Fig. 6

```
const char *task_id = NULL;
if((OK == err) && (OK == (err = task_get_id(task, &task_id)))){
    variant_t *task_id_variant = NULL;

if(OK == (err = variant_create_from_string(task_id, strlen(task_id), &task_id_variant))){
        err = table_add_entry(task_props, TASK_ATTR_ID, task_id_variant);
        (void)variant_release(task_id_variant);
    }
}
return (err = variant_create_from_table(task_props, &task_variant)) ? OK : ERROR;
```

Fig. 11

```
convert_variant_to_task(variant_t *task_details, task_t *task) {
  if(task_details && task) {
    error_t err = OK;
    vartype_t variant_type = VARTYPE_NULL;

if(OK == (err = variant_get_type(task_details, &variant_type))) {
      err = ERROR_PRECONDITION;
      if(OK == (err = variant_is_type(task_details, VARTYPE_TABLE))) {
        table_t *task_prop = NULL;
        if(OK == (err = variant_get_table(task_details, &task_prop))) {

{
        variant_t *id_var = NULL;
        if((OK == err) && (OK == (err = table_get_value(task_prop, TASK_ATTR_ID, &id_var)))) {
            buffer_t *id_buffer = NULL;
            if(OK == (err = variant_get_string_buffer(id_var, &id_buffer))) {
                const char *id = NULL;
                size_t size = 0;
                if(OK == (err = buffer_get_string(id_buffer, &id, &size))) {
                    err = task_set_id(task, id);
                }
                (void)buffer_release(id_buffer);
            }
            (void)variant_release(id_var);
        }
    }
  }

SYSTEMS AND/OR METHODS FOR DATABASE STORAGE USING BINARY LARGE OBJECTS TO GUARANTEE REDUCED COMPLEXITY

TECHNICAL FIELD

Certain example embodiments described herein relate to improved database and database indexing techniques. More particularly, certain example embodiments described herein relate to systems and/or methods that use variant data types and deserializable serialized binary large objects to help guarantee reduced complexity and faster performance when performing database and database index related operations.

BACKGROUND AND SUMMARY

Databases are used to structure and organize data in computing systems for a variety of different purposes. For example, databases oftentimes serve as a backbone to everyday interactions with computers, enabling ecommerce, data archival, and/or other applications to run in an efficient and sensible manner. Databases facilitate advanced analytics operations useful in contexts ranging from sports statistics, to administration of government programs like the census, to management of patient healthcare data, and beyond. Databases organize and collect data empowering social networking sites to determine who to recommend as a friend. Databases can help enable machine learning, computer vision, and artificial intelligence technologies. Databases can even be used to track tasks related to updating databases.

In simple terms, a database may be thought of as an organized collection of data used on a computer. A data type is a particular kind of data, used in programming languages and in databases, on which data manipulation operations can be performed. A data structure is used to organize and store data in a computer efficiently. The data is organized in a way in which it can be retrieved efficiently, e.g., when modifications are needed, when the data needs to be consulted for further processing, etc. A data structure provides the scaffolding necessary to store data in a way in which it allows a user to search, insert, remove, and/or update the data. Although a data structure sets how data is organized and stored, a database is a system that is used to actually store, retrieve, filter, and/or otherwise interact with the data. Information can be stored in the database in different data types. For example, a database could store an integer (whole number), a float value (e.g., a number with a decimal point), a character (a letter), etc., with each being a specific data type.

There are many ways to store and retrieve data, where the data can be manipulated or displayed in several ways. The data stored in a database typically is indexed so that it is easy to retrieve. For example, consider a database including N data items, with a desired data item to be retrieved based on the value of one of the fields. A simple implementation retrieves and examines each item for testing. If there is only one matching item, the testing stops when it finds that single item. For example, when booking an airline ticket, a database may be used to store relevant values, and those values can be later retrieved when a customer or an airline wants to check for specific booking information. But if there are multiple matches, then it tests all of the items. Consider, for example, using the airline booking database to retrieve information for all flights from New York to California on a given day. As a result, the number of operations performed in the worst case has O(N) or linear performance. Because databases these days almost always contain many objects and lookup is a common operation, it often is necessary to improve performance beyond O(N) or linear performance. Indexing can help in this regard.

Most database software includes indexing technology that helps in effective indexing. An index is a copy of one or more selected columns of data from a table in a database or the like that can be searched very efficiently and/or used to retrieve data very efficiently. An index can include low-level disk block addresses, direct links to a complete row of data from which an index entry was copied, etc. Some databases extend the power of indexing by letting developers create indexes on functions or expressions. Typically, several factors are considered when generating indexes to databases. These factors oftentimes include, for example, lookup performance, index size, and update performance. Many indexing techniques achieve logarithmic (O(log(N))) lookup performance, and some are even able to achieve constant time (O(1)) performance.

The following broad types of indexing are used in most database systems:

Bitmap index: Data is stored as bit arrays. A bitmap index is usually used when the values of a variable repeat frequently (e.g., as would be the case with the name field in a passenger airline booking system).

Dense index: Data is stored in pairs of keys and pointers. Every key is associated with a pointer to a record stored in the database.

Sparse index: Data is stored in pairs of keys and pointers as in the dense indexing system, except that every key is associated with a pointer to a block of data stored in the database.

Reverse index: A reverse key index reverses the key value before entering it in the index. For example, the value 24538 becomes 83542 in the index.

These indexing methodologies are advantageous in particular contexts and are useful in their own use cases. Unfortunately, however, not all indexing techniques can be used broadly for all use cases. In this regard, the performance attained from indexing is a database software function, and this performance may vary based on the kind of database used, the database software used, etc. Moreover, the efficiency of indexing can depend on how the index entry is stored, retrieved, and the number of dips into the database needed to retrieve a specific entry. Thus, it is a "best practice" to keep in mind data organization in the early stages of designing a data storage architecture. Unfortunately, however, it is not always easy or feasible to undertake this type of analysis, and doing so can introduce complexities into application development.

It will be appreciated that it would be desirable to address the above-described and/or other issues. For example, it will be appreciated that it would be desirable to provide a database and indexing technology that is suitable for a variety of contexts and use cases and is efficient in data storage, retrieval, and manipulation operations.

One aspect of certain example embodiments relates to addressing the above-described and/or other issues. For example, one aspect of certain example embodiments relates to providing database and indexing technology that is suitable for a variety of contexts and use cases and is efficient in data storage, retrieval, and manipulation operations.

In certain example embodiments, a pre-processing operation encodes the record values to make indexing more efficient. Advantageously, certain example embodiments are able to attain O(1) performance for the retrieval of information. As a result, indexing and subsequent data retrieval operations can become much faster. The specific encoding operations of certain example embodiments also find broad applicability and in this sense are "generic" as to the particular database implementation and data structuring. Thus, certain example embodiments advantageously provide to developers flexibility in information structuring. Certain example embodiments use key-value pairs, where the value points to a record that is encoded in a custom format described herein. Indexing is taken care of by the pre-processing and includes encoding of the record values in the key-value pair. According to certain example embodiments, then, attributes are fetched from schemas through O(1) performance, e.g., using a binary large object (BLOB) as a widely used data-interchange format.

In certain example embodiments, a computing system is provided. A non-transitory computer readable storage medium tangibly stores a database including data and at least one key associated with the data. Memory, separate from the non-transitory computer readable storage medium, stores an index to the data in the database, with the index indexing the data based on the at least one key, and with the index providing key-value pairs in which keys in the key-value pairs correspond to the at least one key associated with the data and values in the key-value pairs correspond to deserializable serialized blobs generated to include the data in variant data type format. The variant data type format includes different possible equivalent representations of the data such that the data stored in the blobs is of potentially different structures. An electronic interface is configured to receive transaction requests related to the database. Processing resources including at least one processor are configured to control at least a part of the computing system to at least respond to a transaction request related to the database, received from a computing device over the electronic interface, in connection with the index.

According to certain example embodiments, values in the key-value pairs may provide pointers to blobs stored in the database.

According to certain example embodiments, the transaction request related to the database may involve an update to the database; and the processing resources may be configured to control at least a part of the computing system to respond to the transaction request by at least: identifying a key associated with the update; accessing the blob corresponding to the value associated with the identified key, using the index; deserializing the accessed blob to provide the variant type format data therein; updating the variant type format data in accordance with the transaction request; re-serializing the updated variant type format data to re-encode the re-serialized updated variant type format data into an updated blob; and storing the updated blob to the database.

According to certain example embodiments, the processing resources may be configured to control at least a part of the computing system to update the variant structure at preset times based on a timer.

According to certain example embodiments, at least one key associated with the data may be a task identifier and the data may include task structures related to tasks to be performed in connection with the system, the tasks being identifiable using the task identifiers. The tasks may be client application tasks associated with transaction requests and are unrelated to system management tasks in certain example instances. In certain example instances, the index may provide access to an array of triggers for the tasks.

According to certain example embodiments, an agent, operating under control of the processing resources, may be configured to cause execution of client application tasks associated with transaction requests asynchronously in responding to received transaction requests, with each client application task having a respective task structure including a respective task identifier. Furthermore, according to certain example embodiments, the agent may be further configured to: receive a first command to temporarily halt pending client application tasks and, responsive thereto, cause the processing resources to control at least a part of the computing system to at least store task-related key-value pairs for the halted pending client application tasks, the keys in the task-related key-value pairs corresponding to task identifiers and the values in the task-related key-value pairs corresponding to serialized blobs of the respective task structures; and receive a second command and, responsive thereto, cause the processing resources to control at least a part of the computing system to deserialize the blobs of the respective task structures to create corresponding runtime tasks. The second command may, for example, be issued following execution of one or more system management tasks.

According to certain example embodiments, each blob may include an indicator specifying its format, e.g., with the indicators identifying at least a serializer used in creating the associated blob.

According to certain example embodiments, the serialization of the blobs may map between data stored in-memory and the corresponding data stored in the database, that data sharing a common semantic value.

In addition to the features of the previous paragraphs, counterpart methods, non-transitory computer readable storage media tangibly storing instructions for performing such methods, executable computer programs, and the like, are contemplated herein, as well. Similarly, servers, client computing devices, and the like, usable in connection with the systems laid out in the previous paragraphs, also are contemplated herein.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 6 is example code corresponding to a scheduler task and trigger structure that may be used in connection with certain example embodiments;

FIG. 11 is an example code snippet that may be used to convert a task into a variant in certain example embodiments;

FIG. 13 is an example code snippet that may be used to convert a variant into a task in certain example embodiments.

DETAILED DESCRIPTION

Figure 1:
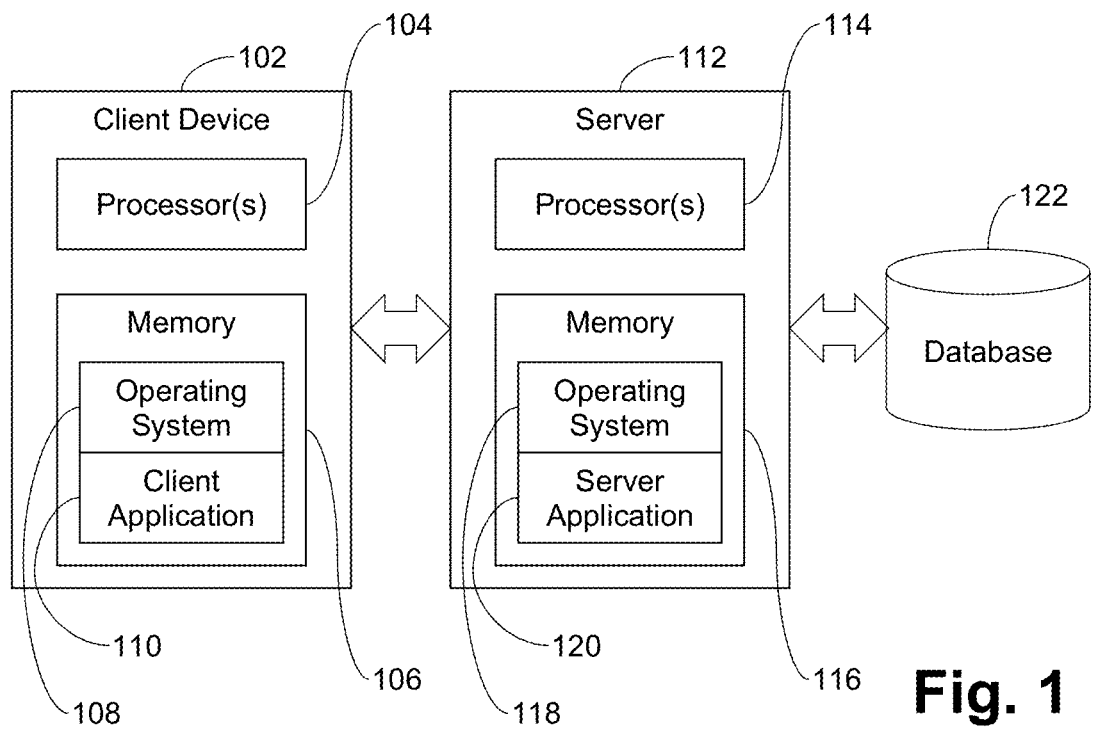
FIG. 1 is a high-level block diagram showing an architecture that may be used in connection with certain example embodiments.

Certain example embodiments described herein relate to improved database and database indexing techniques. More particularly, certain example embodiments seek to achieve an O(1) performance benchmark for indexing by pre-processing data before it is stored in the database, thereby facilitating subsequent retrieval operations. In certain example embodiments, a variant data type and a serialization format provider are used to pre-process and store the data. In taking this approach, the type of database, and manner in which the data is organized, become less important to achieving good performance.

As will become clearer from the description that follows, certain example embodiments help address the problem of how best to index records by implementing a technique that makes use of the more "abstract" variant data type. This technique allows the for the storing of auxiliary keys along with primary keys for each record in a binary large object (blob), and for articulating them into composite keys (where more than one column is considered a primary key for a record in a table). This approach provides flexibility to end-applications in that it advantageously allows different applications to refer to the same record in the table via different auxiliary keys, separate from the schema-defined primary keys. Data that is pre-processed using the approach described herein not only is easily (i.e., quickly) searchable, but also can be deserialized to any open format. The record values are packaged in a way that is easy to retrieve for any given key, and the serializer-deserializer helps in converting the record value to a format that may be used for subsequent processing.

The open source database software SQLite is used to help illustrate aspects of certain example embodiments, but it will be appreciated that the pre-processing approach described herein can be used with any kind of database (open source or commercial). For example, an SQL database such as SQLite or a document oriented and commercially available database such as MongoDB may be used. Thus, the O(1) performance achievable by certain example embodiments may be realized in fetching or storing structured, unstructured, or schema-less data stored in key-value pairs in an application. The key-value data may be in a JSON data format stored as strings, although any other message extension format may be used in different example embodiments.

Regardless of the nested structure of an application, each retrieval action involves looking up the key, fetching the corresponding value, and constructing each key-value pair into an encrypted blob individually for each key-value pair in the data store. From the lookup of the keys in the data store to the construction of the blobs, O(1) performance is attained through very quick indexing and storing of the blobs.

As will become clearer from the discussion below, certain example embodiments involve composing the variant data types (e.g., as GVariants) using a serializer-deserializer provider (e.g., using MessagePack and/or the Apache thrift serializer-deserializer provider) to look up key-value pairs in the database, constructing them into encrypted blobs, and deconstructing the blobs into its original structure. This approach advantageously results in retrieving the information through O(1) performance in a SQL or other database. As a result, application processing time for retrieving and updating individual records can be greatly reduced in certain example implementations.

Certain example embodiments implement a two-stage process, with (1) the first stage including composing multiple technologies such as, for example, MessagePack and/or Apache Thrift for serialization techniques, GVariant data types, and SQL or other database blobs for storage to achieve an O(1) performance goal; and (2) a pre-processing technique for quick indexing of nested schemas in blobs. The pre-processing is performed on the information that is provided by a user or a developer. This information is collated such that the indexing is unaffected by the information design of the information stored in the database. The pre-processing aids in this by encoding the information into a new intermediary blob format.

The blob is read and indexed during runtime, helping to ensure that a database dip to retrieve specific information happens only once for that specific information. During runtime, the blob is fetched from the database, and the entire structure of the blob is processed to decode, deserialize, and transform from the root node to the last leaf node containing recursive keys for multiple entries. Tree traversal is performed on the structure of the blob to retrieve, add, edit, and delete a record value. This operation performed on the blob advantageously is a "once fetch" operation, because the recursive key values are loaded to the memory as a blob and multiple fetches for recursive key values are not required.

In the pre-processing, schemas are contained within variants. A variant holds individual primitive elements such as, for example, int, boolean, string, array, maps, rawbuffer, etc. Furthermore, a variant can nest within multiple variant structures to form one single variant in certain example embodiments. Schemas use the handles provided by serialization formatters, such as MessagePack, Apache Thrift, Protobuf, etc., to concatenate the variant structures to form a serialized stream, fetch the attributes of variants, and update and deserialize the stream into respective schemas during runtime.

During this process, the read-write operation of the variants in the schema is performed all at once. The attributes of only those variants that require an update or modification are updated during runtime and stored in the database memory while the other attributes are released. In the pre-processing, the schema attributes of a serialized stream advantageously can be ported to any different version during runtime. As a result of this portability and versioning capabilities, the attributes can be updated across individual aggregated schema variants seamlessly. Also, the mapping of attributes between schemas is predictable. Therefore, the addition or deletion of columns to a variant structure during runtime (for example) is efficient, especially when compared to the conventional recording of information into the database.

For updating, porting, and/or versioning purposes, certain example embodiments may include a timer or the like can be used to ensure that serialization and database updates to the variant structure take place at preset times in certain example embodiments. Additionally, or in the alternative, the serialization and database update process can be user-triggered. In certain example embodiments, a "dirty flag" can be maintained for each variant in memory, e.g., such that changes are trackable and so that unnecessary serialization and database updates can be avoided if the flags indicate that a change is not needed. Furthermore, for updating, porting, and/or versioning purposes, certain example embodiments may ensure that the format of each blob is identified (e.g., using an indicator provided in or otherwise associated with the respective blobs). The indicator may, for example, identify a serializer used in creating the associated blob. Thus, different serializers may be used in a single implementation in certain example embodiments.

Advantageously, the serialization of schemas and updating of attributes for records is achievable with O(1) performance.

Example Use Case

Details concerning an example implementation and an example use case are provided below. It will be appreciated that this example implementation is provided to help demonstrate concepts of certain example embodiments, and aspects thereof are non-limiting in nature unless specifically claimed. For example, descriptions concerning example serialization and/or other encoding techniques, variant structures, primitives, nesting structures, schemas, etc., are non-limiting in nature unless specifically claimed. Similarly, it will be appreciated that this example use case is provided to help demonstrate concepts of certain example embodiments, and aspects thereof are non-limiting in nature unless specifically claimed. For example, descriptions concerning example data types, tasks, etc., are non-limiting in nature unless specifically claimed. In brief, the example embodiments described herein may be applied in connection with different architectures and/or different use cases.

FIG. 1 is a high-level block diagram showing an architecture that may be used in connection with certain example embodiments. As shown in FIG. 1, a client computing device 102 comprises processing resources including at least one processor 104 and a memory 106. The memory 106 stores an operating system 108 and a client application 110. The client application 110 enables the client device 102 to communicate with a server computing system 112, which similarly may include processing resources including at least one processor 114 and a memory 116, with the memory of the server 112 including an operating system 118 and a server application 120. The client device and the server 112 may communicate with one another using transceivers respectively provided thereto, e.g., over a network such as the Internet. The server 112 interfaces with a database 122, which may be collocated with the server 112 or remote therefrom (as shown in FIG. 1). The client application 110 issues database 122 related requests to the server 112, which are handled by the server application 120. As explained in greater detail below, the server application 120 executes serializer/deserializer program logic to aid in database operations.

Figure 2:
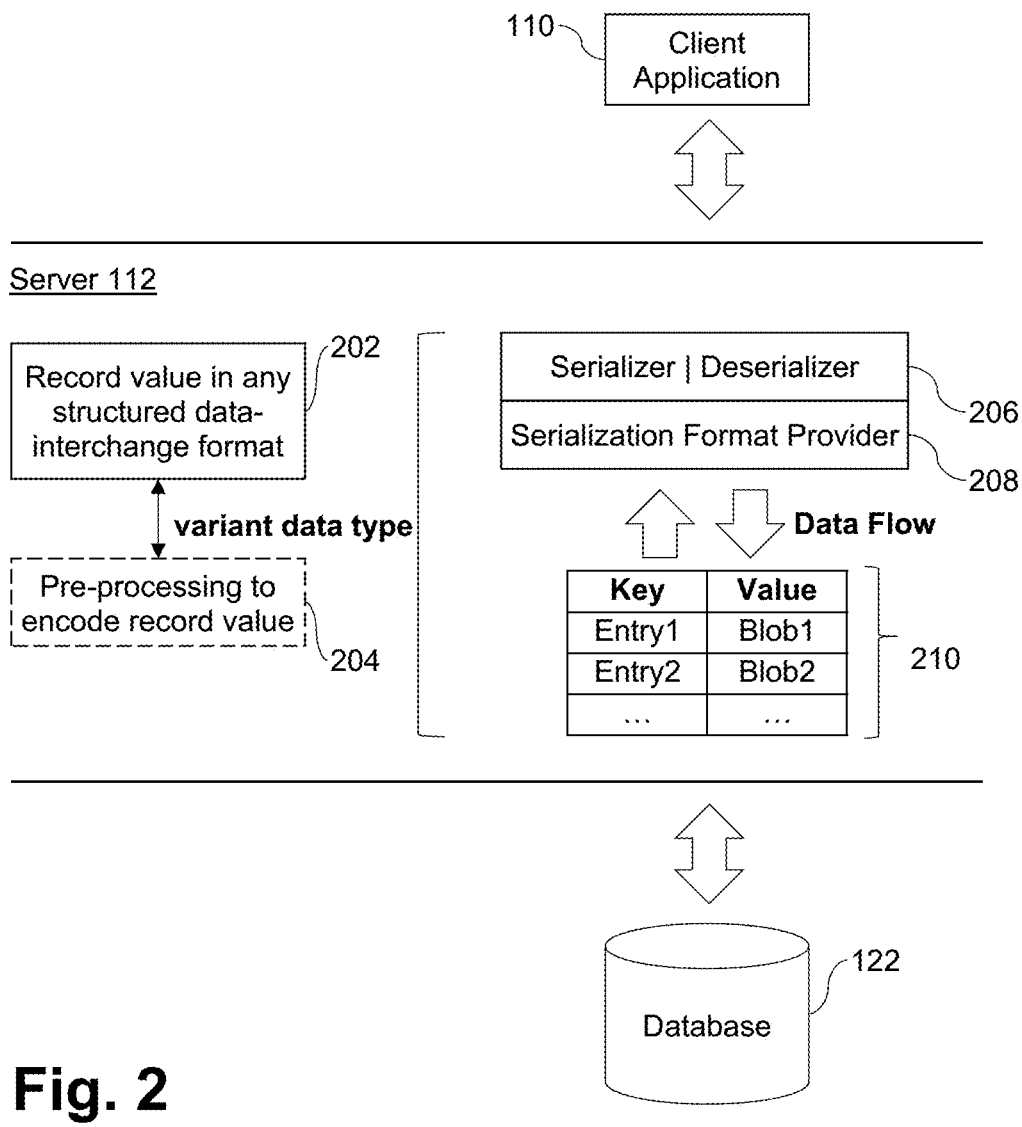
FIG. 2 is a block diagram depicting how the client application accesses, records, and/or updates the record values of any format using a serializer and deserializer pair, in accordance with certain example embodiments.

FIG. 2 is a block diagram depicting how the client application 110 accesses, records, and/or updates the record values of any format using a serializer and deserializer pair, in accordance with certain example embodiments. As shown in FIG. 2, the external client application 110 provides input to the server 112. The input in this example is a record value 202 in any structured data-interchange format (such as, for example, XML, JSON, and/or the like). The record value 202 is converted into a variant data type (such as, for example, the GVariant data type), and pre-processing 204 is performed on the converted data to encode it into a blob. The blob is the encoded format and is easily indexed. In this regard, the server application 120 shown in FIG. 1 may include or otherwise access a serializer-deserializer module 206, which helps convert the data that is provided to it into a serialization format. A serialization format provider 208 is used to store the serialized information in a specific format (such as, for example, the MessagePack format). A table of key-value pairs 210 is created and maintained. This structure, or an equivalent thereof, may be used as an index and may be stored at the server 112 and/or the database 112. In certain example embodiments, the key will be key information from the data (e.g., a primary key, composite key, and/or the like), and the value will be a pointer to a separate storage location. As noted, the database 122 may be remote from the server 112 in certain example embodiments and may be in any suitable format such as, for example, SQLite. The database 112 may be backed by physical storage.

Figure 3:
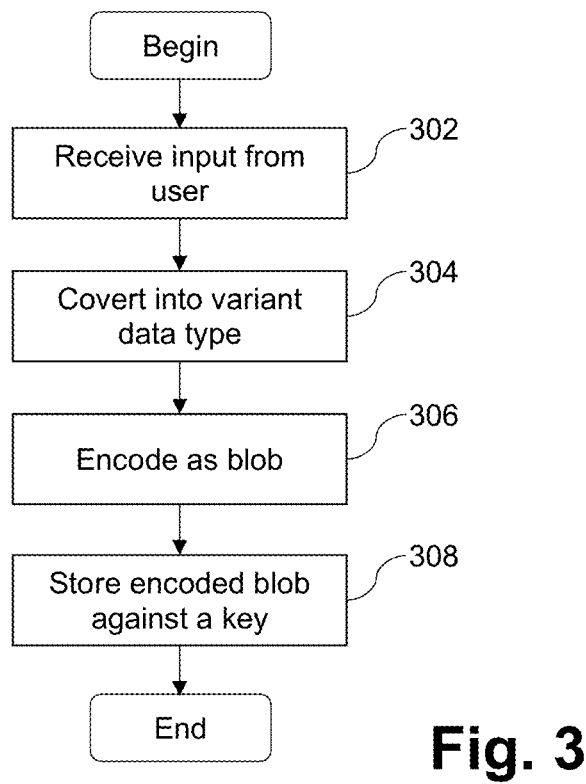
FIG. 3 is a flowchart showing example pre-processing operations that may be used in connection with certain example embodiments.

FIG. 3 is a flowchart showing example pre-processing operations that may be used in connection with certain example embodiments. As shown in FIG. 3, in step 302, input is received from the user. The input may be a request to retrieve data from the database, a request to delete data from the database, a request to update data in the database, etc. Information from that input is converted into a variant data type in step 304 and encoded into a blob in step 306. The encoded blob in step 308 is stored as a value against a key in an index in and/or separate from the database.

Certain example embodiments that leverage the disclosed techniques for optimizing the indexing of data in databases are advantageous in that some or all of the following and/or other technical advantages are achievable: indexing of record values efficiently; retrieval of information through fast (e.g., O(1)) performance; ability to store lengthy values in compressed blobs that can again be retrieved in any required format; dynamic storage and retrieval of data in compressed blobs; serialization, deserialization, and conversion are transparent to the user; ability to perform on-demand read-write operation on variant structures all at once; ability to refactor schemas by porting variant structures across multiple versions; ability to predict variant structures to be updated during runtime; ability to nest individual attributes of individual variants within multiple variant structures through array indexing; etc.

To help demonstrate these example advantages and to help demonstrate that the techniques can be used in connection with different types of data (e.g., as opposed to relatively simple data storage/retrieval/update operations), an example use case pertaining to a distributed architecture will now be provided. In a distributed architecture, the products present in a distributed repository sometimes are replicated and managed by the distributed server. A common example of where this may occur is in a client-server architecture (although the example techniques may be applied in different architectures). The products within a distributed architecture communicate with each other over a network to achieve a specific goal. This communication network typically is controlled by a distributed client-side Bootstrap Agent that provides a secure connection between the server and the client.

The Bootstrap Agent caches products and related information received from a server (e.g., over HTTP or in connection with an FTP repository) in the system nodes of the client. It can store single or multiple products in one node. In addition, the Bootstrap Agent serves as an updater for the managed and unmanaged products of a particular node. The system nodes of a client typically include multiple active tasks that perform the activities such as, for example, installing products and their patches/upgrades; updating client-related policies; enforcing policies; scheduling tasks specific to the products; gathering information and events from the nodes and sending them to the distributed server; performing task management for the client; storing task-related information of specific products and events in a database (e.g., the SQLite relational database or the like); etc.

Figure 4:
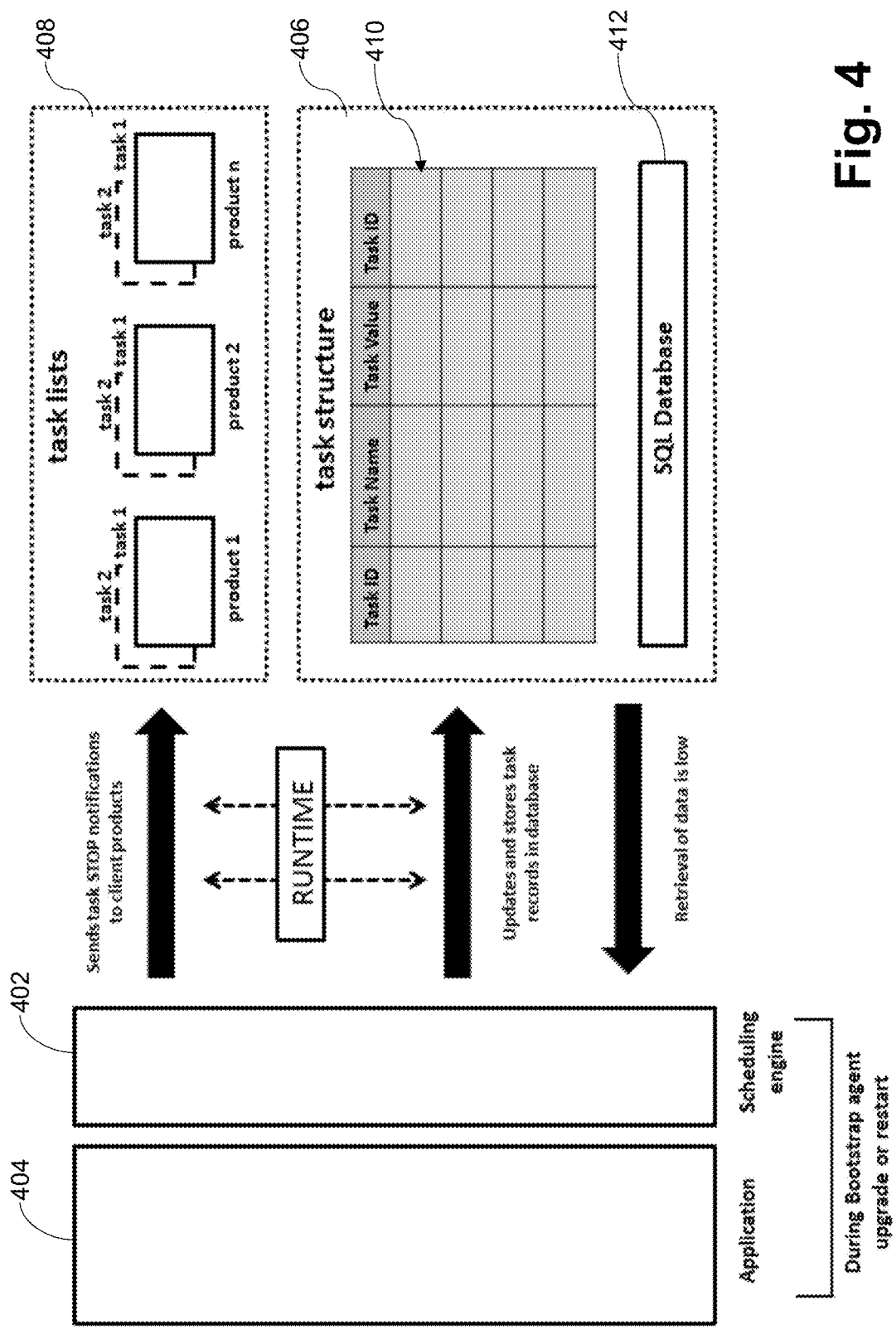
FIG. 4 is a block diagram including components in a Bootstrap Agent architecture and helps illustrate how update tasks typically are handled.

FIG. 4 is a block diagram including components in a Bootstrap Agent architecture and helps illustrate how update tasks typically are handled. In general, the Bootstrap Agent infrastructure may be thought of as being message-oriented middleware that follows a single-threaded and asynchronous model. Being a messaging-based architecture, the Bootstrap Agent includes many components including, for example, a scheduler, updater, profiler, etc. Thus, the Bootstrap Agent and at least some of its components (including, for example, those just mentioned) in certain example instances are implemented in computing systems, e.g., as program code executable by processing resources including one or more processors and a memory. The Bootstrap Agent includes services to communicate with products through a common language. This reduces the usage of system resources, such as number of threads, number of handles, memory, CPU, etc.

The scheduler 402 is responsible for scheduling client product tasks originating with a client application 404 and storing the task information into the scheduler data store 406. Task lists 408 identify different tasks associated with different products. It is noted that these tasks are client application tasks, which may be unrelated to system management tasks (e.g., associated with a patch, update, and/or the like). A scheduler data store 406 is a container where the task information is stored. The task structure 410 maintains, for each of the different tasks being executed, a list of the respective task name, task status, task ID, task application details, trigger details, etc. The task structure 410 may be stored into the relational or other database 412. The scheduler 402 also owns scheduler services that run client tasks based on time intervals such as, for example, run-once; run-immediately; run daily, weekly, monthly; run on system start up on logon; etc. The Bootstrap Agent's scheduler 402 also is responsible for scheduling upgrade, patch, and/or other tasks that do not originate with the client application 404. The Bootstrap Agent scheduler 402 schedules tasks based on the tasks' parameters and does not itself execute them in many cases.

One problem with this approach relates to the functionality of the scheduler 402 of the Bootstrap Agent and can be appreciated from FIG. 4. The Bootstrap Agent scheduler 402 stores the task information of a client into a data store (using a SQLite or other database 412) synchronously, i.e., one at a time. When an external factor (such as, for example, a system upgrade, service restart, etc.) intervenes, the Bootstrap Agent pauses active tasks running for a client product, enables the "update" to take place, and commits the status of each task individually into the data store. This behavior unfortunately leads to a massive performance hit, causing a delay during the stoppage of tasks during runtime and while recording individual task statuses to the database 412. The delay time is a factor of the number of client scheduled tasks that exist in the system and is calculated as follows:

Time taken to stop tasks=Stop notifications to client products+Task status update and commit in database Delay time(in milliseconds)=No. of scheduled tasks*Time taken to stop tasks To elaborate further, when third-party products associated with the Bootstrap Agent request it to schedule tasks, the Bootstrap Agent adds these tasks to the task lists 408 using the scheduler 402. Then, the Bootstrap Agent scheduler 402 schedules these tasks based on their parameters and records all the fields of a particular task, one at a time. When an external factor intervenes with the Bootstrap Agent service/process, the Agent is forced to restart. When a restart is triggered for the Bootstrap Agent service/process in the task schedule window of the operating system, the Bootstrap Agent sends out shutdown notifications to all its components, such as its scheduler, profiler, and so on, to enable client products to send a stop notification to all the tasks associated with their products. In parallel, the scheduler also saves all the record details (e.g., task status, task information, etc.) of each active task, one at a time, sequentially into the database 412 of the scheduler data store 406.

This approach has been found to work smoothly in some instances. However, it was found that when third-party/client products started sending out stop notifications to multiple tasks, problems arose. For example, during the restart, the Bootstrap Agent will honor external requests and initiate them. But when there are too many tasks to be handled by the scheduling engine of the Bootstrap Agent, the need to update the Bootstrap Agent itself or send a restart trigger arises, e.g., to start and stop the process. As a result, responding to multiple scheduling requests during the restart or upgrade of the Bootstrap Agent and the input/output operations to query the task information in the scheduler data store of the database was found to take a long time. Also, when the Bootstrap Agent was restarted to bring up a service again, it had to start the tasks all over again and retrieve the tasks from the previous state where they had stopped. Thus, the latency of retrieving large numbers of records from the database was high, and the Bootstrap Agent was not shutting down gracefully.

The approach of certain example embodiments can, however, be used to help address these issues. For example, as shown in greater detail below, the approach of certain example embodiments can help provide for improved latency, more graceful restarts (and/or a reduced need to force a restart), etc., e.g., under the same or similar circumstances. Certain example embodiments introduce pre-processing to perform array indexing on the individual table structures of the data before storing them into the SQL database. Array indexing on the table structures optimizes the database search and access to the database columns. In some implementations, the database will by default automatically create an index on primary and unique columns for each table (for example, Task Name), and the pre-processing operations of certain example embodiments will help encode the values of the task records into blobs to make task indexing more efficient in the database.

Figure 5:
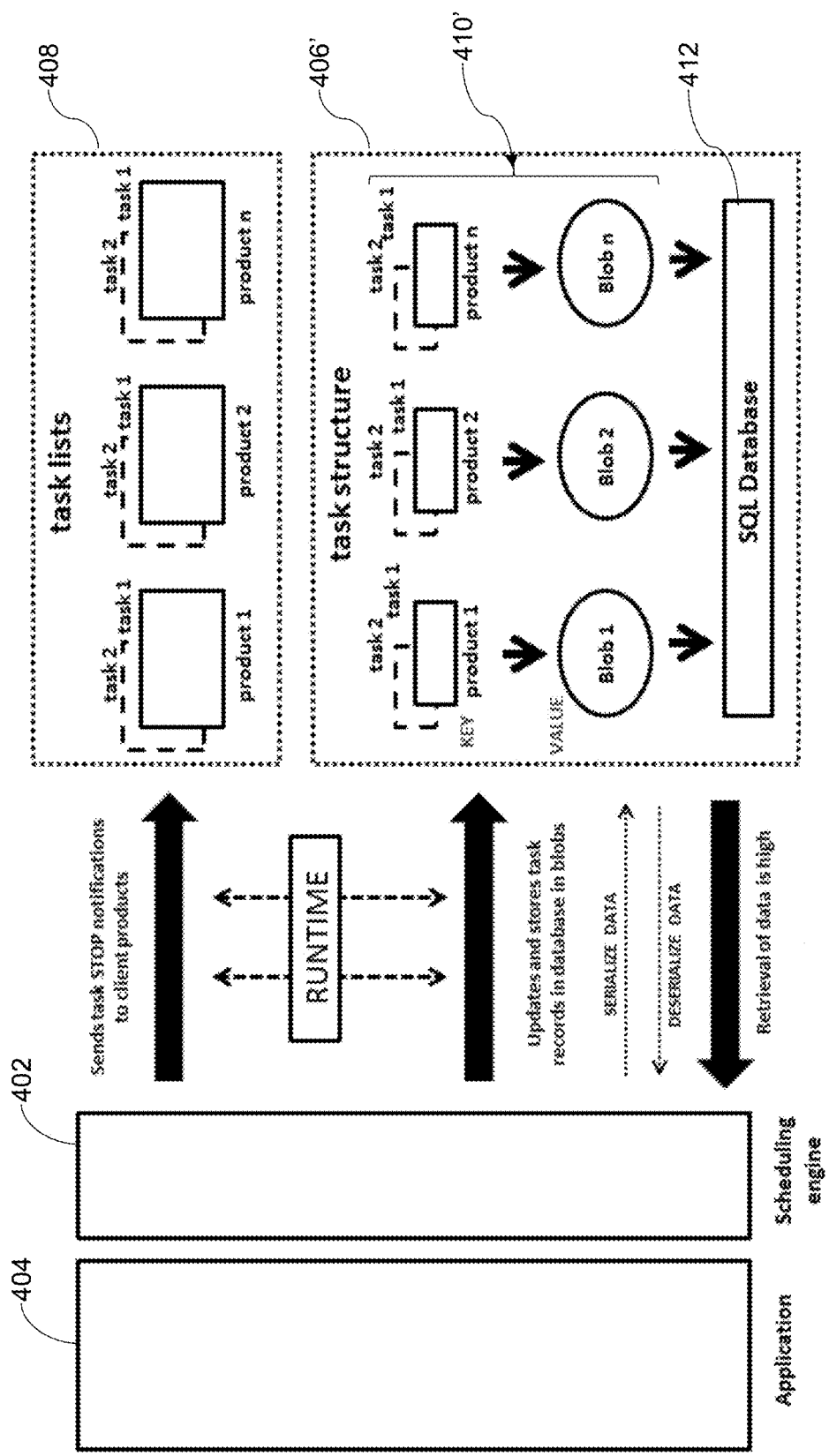
FIG. 5 is a block diagram showing how the techniques described herein can be applied to solve problems that arise in connection with FIG. 4, in certain example embodiments.

FIG. 5 is a block diagram showing how the techniques described herein can be applied to solve problems that arise in connection with FIG. 4, in certain example embodiments.

As shown in FIG. 5, when the application 404 is stopped, the application 404 sends a stop signal to the scheduler 402. The scheduler 402, in turn, sends stop notifications to the client product tasks in the task lists 408. The updates are processed, and task records are stored in the database 412 as blobs. This involves the scheduler 402 serializing the tasks. More particularly, the scheduler 402 stores each task ID as the task's key, and the value as the serialized blob in the data store 406'. Thus, the table 410 of FIG. 4 is replaced with the simpler key-value pairs 410' in FIG. 5. When restarting the application 404, then, the scheduler 402 reads the task structure 406' and determines the tasks therein, deserializes the blobs, and transforms them into runtime tasks.

The following helps explain in greater detail the functionality briefly described in connection with FIG. 5. While indexing, the task information is serialized and converted into a blob that is encoded. A blob is a collection of binary data stored as a single entity in a database management system. Similarly, the blobs are deserialized and decoded into individual task information elements. The construction and deconstruction of data into and from blobs is performed during runtime. The internal architecture of a task record holds information stored in various data types. While indexing, these data types are converted into a variant data type (for example, GVariant) by traversing each data type. The converted data type is serialized using a serialization format, such as MessagePack, and this data is reconverted to task format during runtime.

When an external factor intervenes, the Bootstrap Agent process/service on the client-side retrieves the scheduled client task information stored in blobs in the database with O(1) performance. To achieve this, in certain example embodiments each row or column in a table is hash-mapped and every indexed record in table is traversed in a sequential process to construct and deconstruct the blobs. In computer programming, O(1) performance is considered to be very fast and O(N) performance is considered to be slow. In order to achieve optimized performance for the retrieval of data, and as alluded to above, the task information is stored in the form of "key-value" pairs in each database record, where the "key" is the task name and the "value" is the entire task information in the encoded (e.g., hash-encrypted) blob. The pre-processing techniques are programmed or otherwise configured to format the task information into encoded blobs before storing them as individual database record values. This mechanism ultimately leads the Bootstrap Agent process to retrieve task information from the database in the previous persisted state and makes it possible to attain O(1) performance.

A blob is a value in an internal key-value store, a storage paradigm that is designed for storing, retrieving, and managing associative arrays (for example, hash maps). Applications treat a blob as a single opaque structure of data for every record. The data is stored on specific data types (e.g., as set forth in greater detail below). Blobs access the runtime structures of an application and transform fields into individual key-value pairs. This action enhances quick updating and retrieval of data. In theory, a blob is a data structure that supports different kinds of values. A key-value typically pair stores string keys associated to string values. However, with the blobs of certain example embodiments, the value associated with the key-value pair is not limited to a simple string but instead can hold more complex data structures relevant and use to applications.

A blob may support data structures including keys, strings, lists, hashes/tables, tasks, triggers, task and trigger definitions, and/or the like, e.g., depending on the particular implementation. It will be appreciated that the types identified in the previous sentence are relevant to this example, and a short description of each will now be provided:

Keys: Keys are binary safe, meaning that it is possible to use any binary sequence as a key, from a string (for example: foo) to the content of an unorganized structure of the application. An empty string value is also considered as a valid key in certain example embodiments. Guidance for key definition includes avoiding the use of very long keys, avoiding the use of very short keys, the desirability of using schemas (e.g., "object-type:id"), comporting with a maximum allowed key size (e.g., 512 bytes), ensuring that keys do not expire, etc.

Strings: Strings are in some instances the simplest type of values to use as keys. Strings may be memory cached to store read-only data. Because the keys within blobs typically will be strings, when a string type is used as a value too, the string is mapped to another string. Setter and getter methods, for example, can be used to store and retrieve a string value. In some implementations, using the set method will replace any existing value that is already stored in the key. In this case, the key already exists even if the key is associated with a non-string value.

Lists: Lists are collections of elements and in some instances may be ordered. For example, "10,20,1,2,3" is a list. The properties of a list may be implemented using an array, linked list, or the like, in different example embodiments.

Hashes/Tables: Hashes are field-value pairs in blobs and represent objects in certain example embodiments. The number of fields that a hash can contain has no real practical limits (other than the available memory) in most instances. Thus, hashes can be used in many different ways within an application. Also, utilities can set multiple fields of a hash, while a table_get_entry method can retrieve a single field. A table_get_all method may be thought of as being similar to a table_get_entry but instead return an array of values.

Task: A task structure includes parameters such as, for example, ID, name, creator, trigger list, attributes, policies, etc.

Trigger: A trigger structure includes parameters such as, for example, ID, begin date, end date, trigger policy, etc.

Task and Trigger Structure: The scheduler task and trigger structure may be as provided in FIG. 6. In a related regard, example task and trigger key definitions are set forth in the following two tables.

TABLE 1

Example Task Definition

| Task Key | Definition |
| --- | --- |
| TASK_ATTR_ID | "task_id" |
| TASK_ATTR_CONDITIONS | "task_conds" |
| TASK_ATTR_RETRY_POLICY | "task_retry_policy" |
| TASK_ATTR_REPEAT_POLICY | "task_repeat_policy" |
| TASK_ATTR_RANDOMIZE_POLICY | "task_randomize_policy" |
| TASK_ATTR_DELAY_POLICY | "task_delay_policy" |
| TASK_ATTR_APP_PAYLOAD | "task_app_payload" |
| TASK_ATTR_EXEC_STATUS | "task_execution_status" |
| TASK_ATTR_MAX_RUN_TIME | "task_max_run_time" |
| TASK_ATTR_MAX_RUN_TIME_LIMIT | "task_max_run_time_limit" |
| TASK_ATTR_MISSED_POLICY | "task_missed_policy" |
| TASK_ATTR_PRIORITY | "task_priority" |
| TASK_ATTR_CREATOR | "task_creator" |
| TASK_ATTR_TRIGGER_LIST | "task_trigger_list" |
| TASK_ATTR_NAME | "task_name" |
| TASK_ATTR_TYPE | "task_type" |

TABLE 1-continued

Example Task Definition

| Task Key | Definition |
| --- | --- |
| TASK_ATTR_STATE | "task_state" |
| TASK_ATTR_EXECUTION_STATUS | "task_execution_status" |
| TASK_ATTR_SOFTWARE_ID | "task_software_id" |
| TASK_ATTR_LAST_RUN_TIME | "task_last_run_time" |
| TASK_ATTR_NEXT_RUN_TIME | "task_next_run_time" |
| TASK_ATTR_TIME_ZONE | "task_time_zone" |
| TASK_ATTR_POWER_POLICY | "task_power_policy" |
| TASK_ATTR_MISSED | "task_missed" |

TABLE 2

Example Trigger Key Definitions

| Trigger Key | Definition |
| --- | --- |
| TRIGGER_ATTR_ID | trigger_id" |
| TRIGGER_ATTR_POLICY | "trigger_policy" |
| TRIGGER_ATTR_BEGIN_DATE | "trigger_begin_date" |
| TRIGGER_ATTR_STATE | "trigger_state" |
| TRIGGER_ATTR_END_DATE | "trigger_end_date" |
| TRIGGER_ATTR_TYPE | "trigger_type" |
| TRIGGER_ATTR_NEXT_FIRE_DATE | "trigger_next_fire_date" |
| TRIGGER_ATTR_LAST_FIRE_DATE | "trigger_last_fire_date" |

Figure 7:
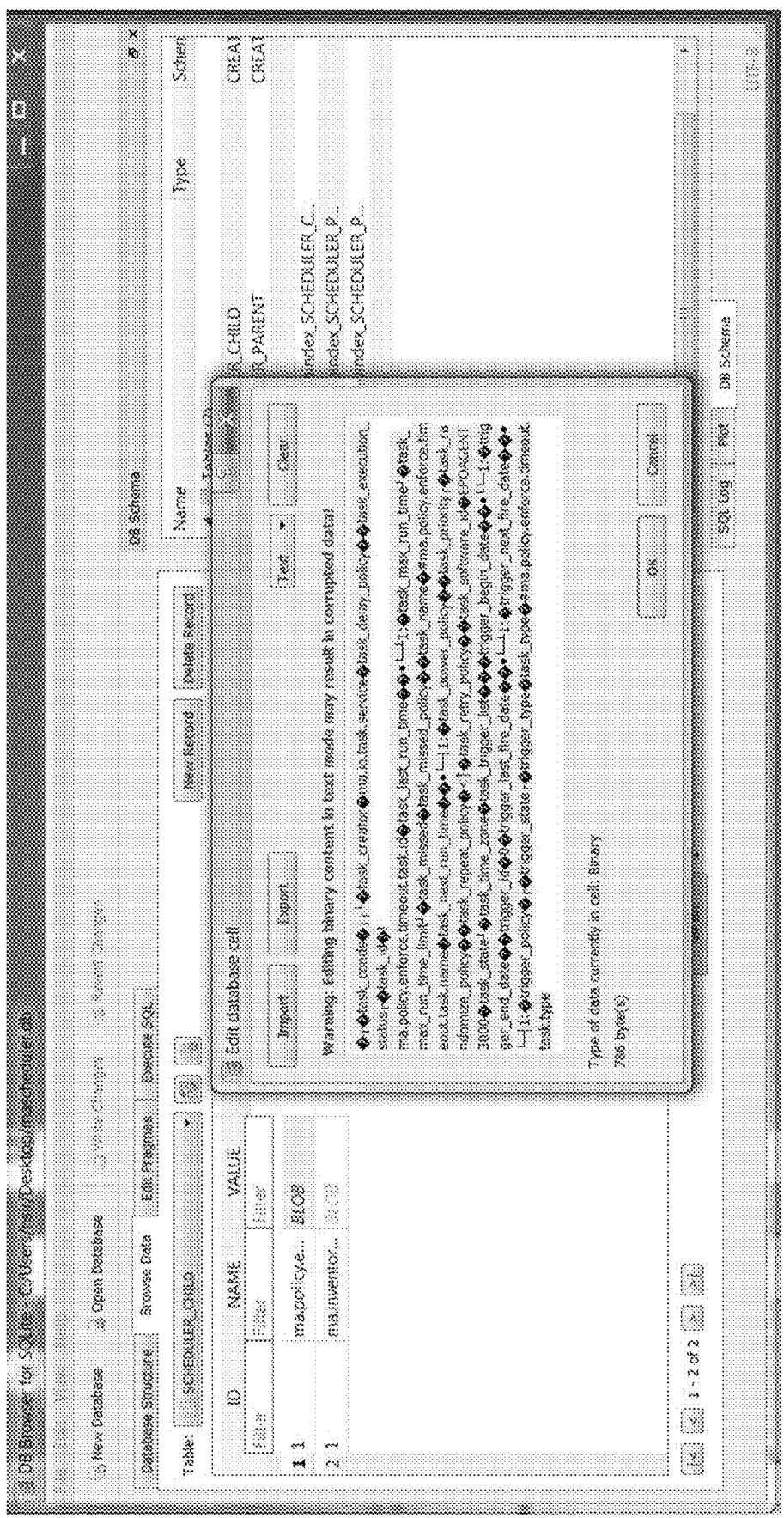
FIG. 7 is a real-time snapshot of the "task_conds" attribute of a task structure, shown in a SQLite browser, for illustrative reference purposes.
Figure 8:
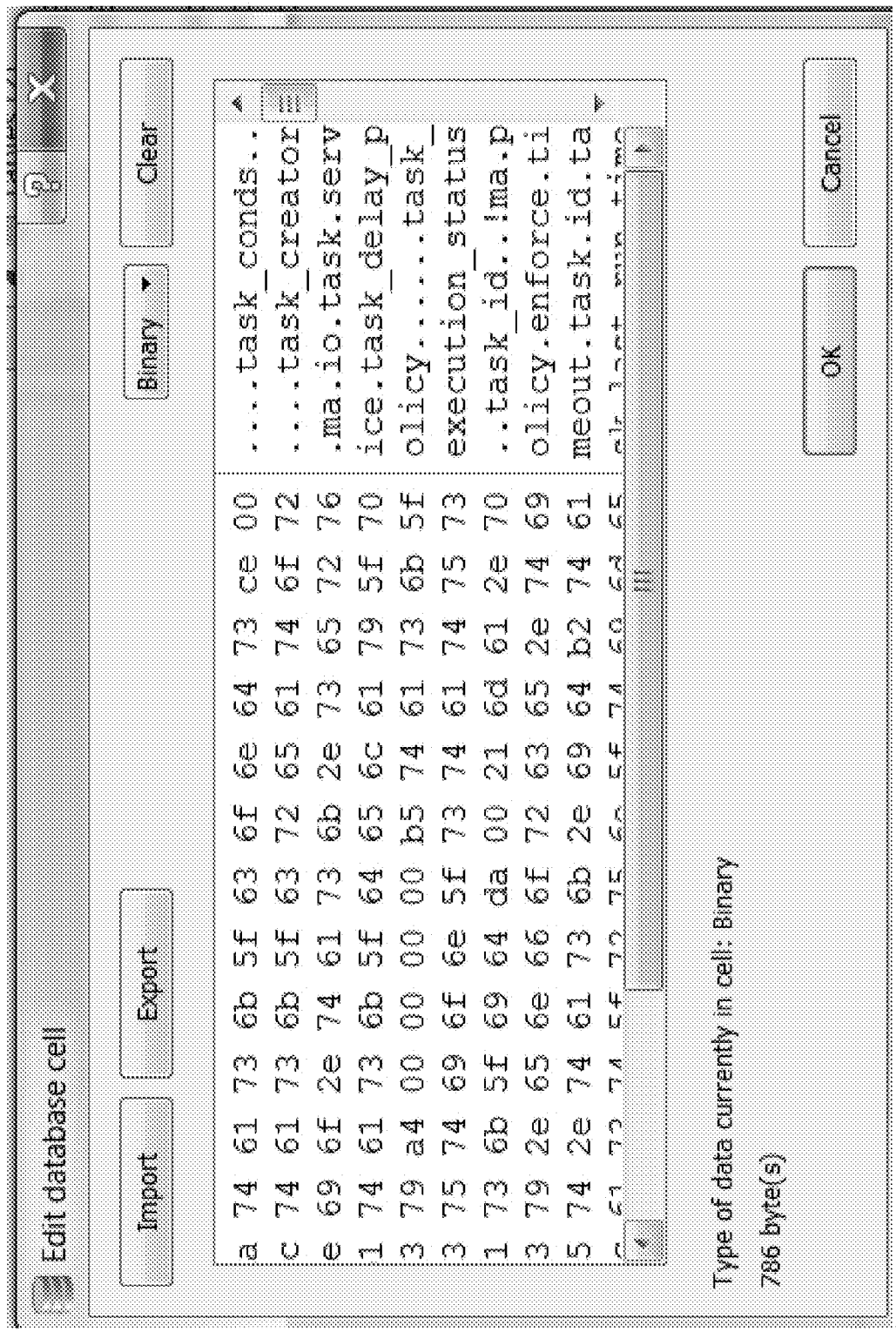
FIG. 8 provides an example of encoded blob information in a SQLite viewer, for illustrative reference purposes.

A description of the physical representation of a blob in the database will now be provided. Each task handle includes either single or multiple triggers within its trigger list. On saving the task in the database, the task will be stored against the Task Name and/or Task ID, or the task itself may be encoded with values. For example, FIG. 7 is a real-time snapshot of the "task_conds" attribute of a task structure, shown in a SQLite browser, for illustrative reference purposes. It is mapped to the TASK_ATTR_CONDITIONS task string, as shown in Table 1. In contrast with FIG. 7, FIG. 8 provides an example of encoded blob information in a SQLite viewer, for illustrative reference purposes.

Figure 9:
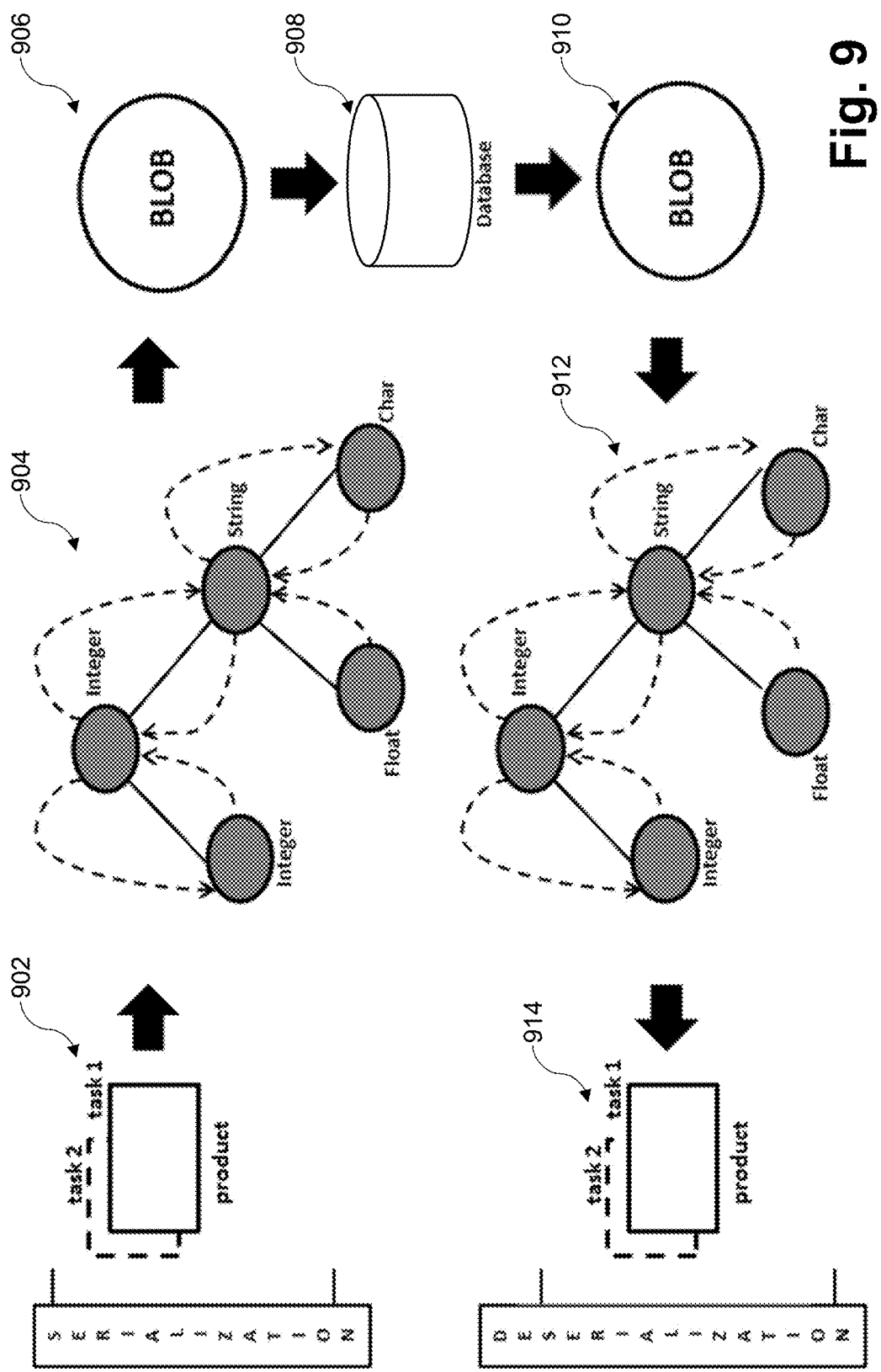
FIG. 9 schematically demonstrates the construction and deconstruction of a task and trigger structure, in accordance with certain example embodiments.

FIG. 9 schematically demonstrates the construction and deconstruction of a task and trigger structure, in accordance with certain example embodiments. The client products provide input task structures, as shown in step 902 of FIG. 9. The respective nested structures are expected to provide serialization handles (e.g., as shown in more detail in step 1002 of FIG. 10, discussed below). The serialization handles refer to the FIGS. 11 and 13 example code snippets that convert a task to a variant, and variant to a task, respectively. During the pre-processing, while saving a task, first the internal/nested structures of triggers, and then the outer task structures, is converted into encoded formats using variant data types, as indicated in step 904. In the example use case being discussed, the attributes of triggers and tasks are serialized before saving a task. An encoded blob then is stored against a key in the database, as indicated in step 906.

Similarly, on retrieving a task from the database in step 908 in the form of an encoded blob, the blob is retrieved in step 910, and first the task structure and then the trigger structure is deserialized and constructed into a real-time scheduler task structure using the variant data types in step 912. Internally, the task and trigger attributes are mapped into associative index arrays, such as balanced HashMaps, for example, to enable the fetching of task information related to a client product quickly and to attain O(1) performance. For example, "task_creator"="client product" {key=value} code may be used. In any event, the reconstructed tasks ultimately are shared with the client products in step 914.

Therefore, the storing and retrieving of task information from and to the scheduler data store, accessing the attributes from task and trigger structures, and processing each task attribute is attainable with O(1) performance.

Figure 10:
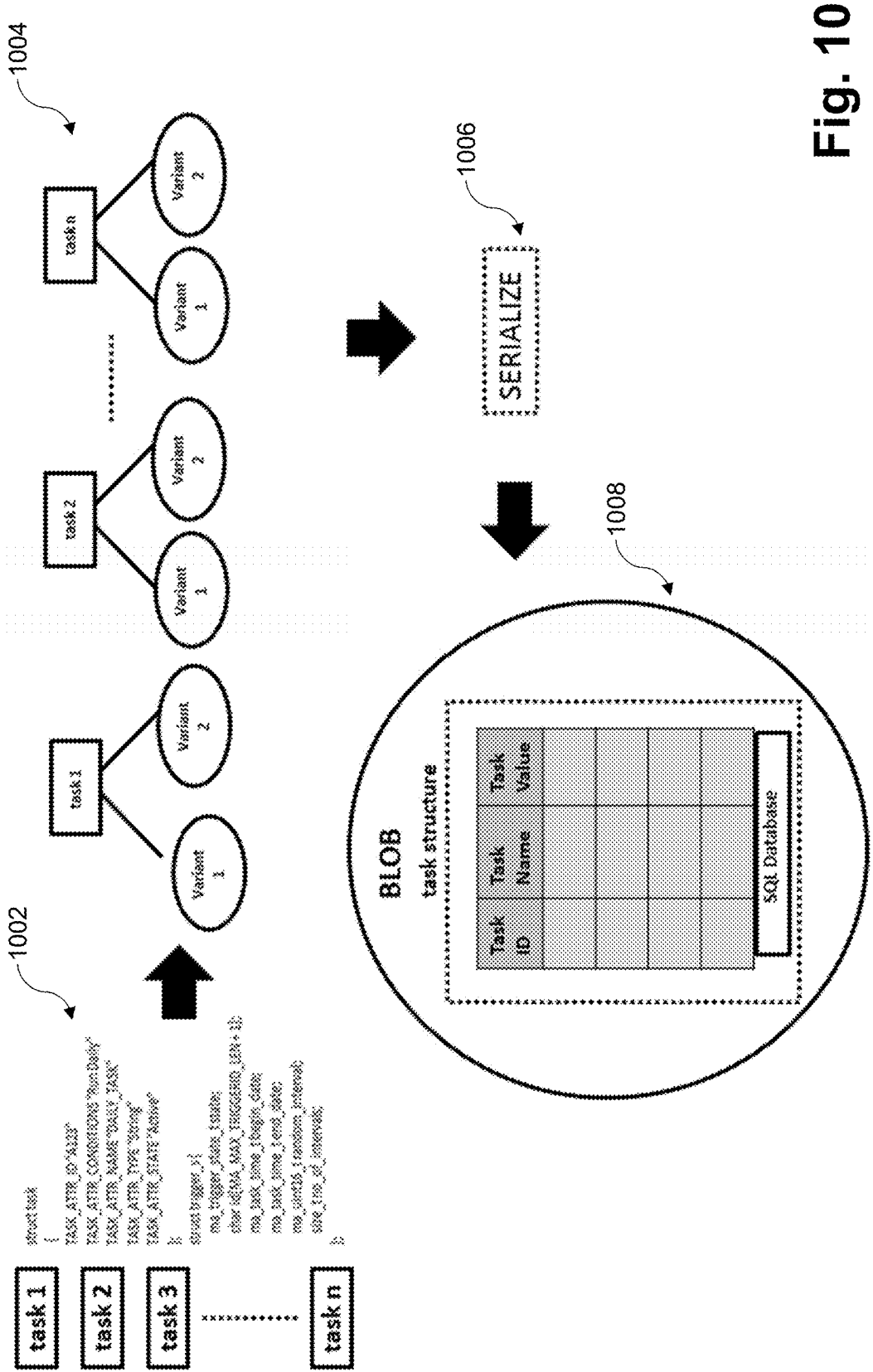
FIG. 10 schematically shows pre-processing operations that may be used for converting a task into a variant, in accordance with certain example embodiments.

The task and trigger key definitions map individual fields of opaque data structures of task and triggers and store them in blobs during runtime. FIG. 10 schematically shows pre-processing operations that may be used for converting a task into a variant, in accordance with certain example embodiments. In step 1002 of FIG. 2, a string variant is constructed by fetching the task id from the task handler, e.g., using the task_get_id( ) method in connection with the runtime task structure. The string variant is then added into the hash table, with task_props as a mapped key-value pair (TASK_ATTR_ID, task_id_variant). The "task_props" definitions can be understood from the example code snippets provided in FIGS. 11 and 13. The list of string definitions applicable in this example are provided above in Table 1 and Table 2.

In step 1004, a table variant is created from the hash table by using the variant handler, e.g., using the variant_create_from_table( ) method after successful mapping k,v in the task table. Similarly, a trigger variant is also created and added into the main task variant by assigning individual trigger fields to the task. After the task variant is fully constructed, in step 1006, the task data is serialized, and converted into simple raw stream data in the form of blobs, which are then stored as individual records in the database as key-value pairs (task id and blob), as indicated in step 1008.

FIG. 11 is an example code snippet that may be used to convert a task into a variant in certain example embodiments.

Figure 12:
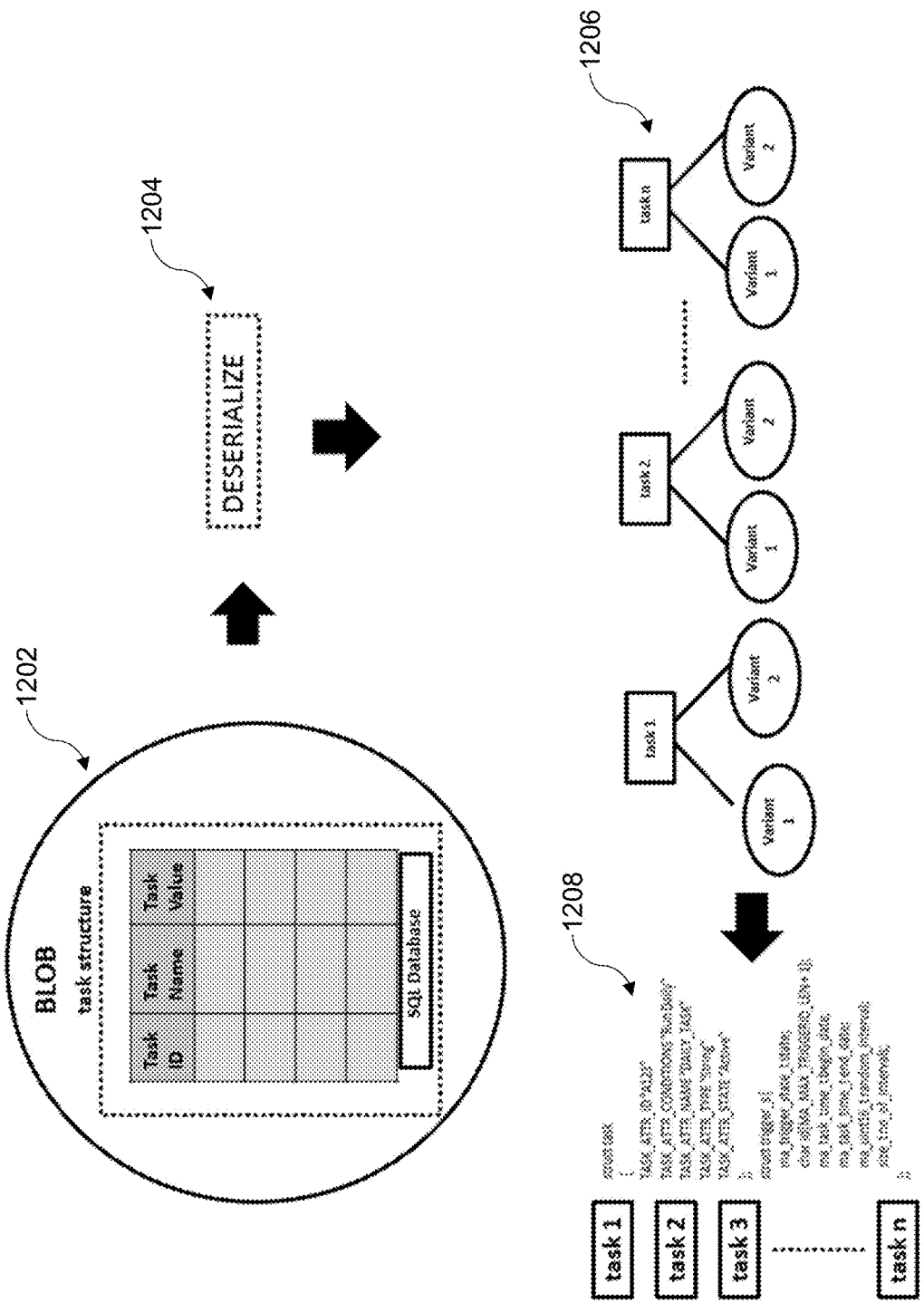
FIG. 12 schematically shows pre-processing operations that may be used for converting a variant into a task, in accordance with certain example embodiments.

FIG. 12 schematically shows pre-processing operations that may be used for converting a variant into a task, in accordance with certain example embodiments. The task blob is fetched based on the task id from the scheduler data store in step 1202. The task and trigger variants are deserialized in step 1204. A task variant is created from the task blob in step 1206, with the task properties for the hash table being generated from the task variant. In step 1208, the task variant, TASK_ATTR_ID, is fetched by mapping the key TASK_ATTR_ID from the task properties of the hash table. The task id string is fetched from the TASK_ATTR_ID variant, and it is stored into the runtime scheduler task structure.

FIG. 13 is an example code snippet that may be used to convert a variant into a task in certain example embodiments.

Although certain example embodiments have been described in connection with binary large objects or blobs, it will be appreciated that different example embodiments may be used in connection with different data types that, in essence, are merely stored as big amorphous chunks of data. For instance, while many databases support blobs, others support the same or similar functionality with different (or at least differently named) data types, and the example techniques described herein may be used in connection with the same.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape back-ups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computing system, comprising:
    a non-transitory computer readable storage medium tangibly storing a database including data and at least one key associated with the data;
    memory, separate from the non-transitory computer readable storage medium, storing an index to the data in the database, the index indexing the data based on the at least one key,
    the index providing key-value pairs in which keys in the key-value pairs correspond to the at least one key associated with the data and values in the key-value pairs correspond to deserializable serialized blobs generated to include the data in variant data type format,
    the variant data type format including different possible equivalent representations of the data such that the data stored in the blobs is of potentially different structures;
    an electronic interface configured to receive transaction requests related to the database; and
    processing resources including at least one processor, the processing resources being configured to control at least a part of the computing system to at least respond to a transaction request related to the database and involving an update to the database, received from a computing device over the electronic interface, in connection with the index, by at least:
        identifying a key associated with the update;
        accessing the blob corresponding to the value associated with the identified key, using the index;
        deserializing the accessed blob to provide the variant type format data therein;
        updating the variant type format data in accordance with the transaction request;
        re-serializing the updated variant type format data to re-encode the re-serialized updated variant type format data into an updated blob; and
        storing the updated blob to the database.

2. The system of claim 1, wherein values in the key-value pairs provide pointers to blobs stored in the database.

3. The system of claim 1, wherein the at least one key associated with the data is a primary key for the database.

4. The system of claim 1, wherein the processing resources are configured to control at least a part of the computing system to at least respond to transaction requests related to the database with O(1) performance by referencing the index.

5. The system of claim 1, further comprising a timer, wherein the processing resources are configured to control at least a part of the computing system to update the variant structure at preset times based on the timer.

6. The system of claim 1, wherein the at least one key associated with the data is a task identifier and the data includes task structures related to tasks to be performed in connection with the system, the tasks being identifiable using the task identifiers.

7. The system of claim 6, wherein the tasks are client application tasks associated with transaction requests and are unrelated to system management tasks.

8. The system of claim 6, wherein the index provides access to an array of triggers for the tasks.

9. The system of claim 1, further comprising an agent, operating under control of the processing resources, configured to cause execution of client application tasks associated with transaction requests asynchronously in responding to received transaction requests, each client application task having a respective task structure including a respective task identifier.

10. The system of claim 1, wherein each blob includes an indicator specifying its format.

11. The system of claim 10, wherein the indicator identifies at least a serializer used in creating the associated blob.

12. The system of claim 1, wherein at least some of the blobs include data organized in accordance with nested schemas.

13. The system of claim 1, wherein serialization of the blobs maps between data stored in-memory and the corresponding data stored in the database, that data sharing a common semantic value.

14. The system of claim 1, wherein the computing device is located remote from the database and the electronic interface is a network interface.

15. A computing system, comprising:
    a non-transitory computer readable storage medium tangibly storing a database including data and at least one key associated with the data;
    memory, separate from the non-transitory computer readable storage medium, storing an index to the data in the database, the index indexing the data based on the at least one key,
    the index providing key-value pairs in which keys in the key-value pairs correspond to the at least one key associated with the data and values in the key-value pairs correspond to deserializable serialized blobs generated to include the data in variant data type format,
    the variant data type format including different possible equivalent representations of the data such that the data stored in the blobs is of potentially different structures;
    an electronic interface configured to receive transaction requests related to the database;
    processing resources including at least one processor, the processing resources being configured to control at least a part of the computing system to at least respond to a transaction request related to the database, received from a computing device over the electronic interface, in connection with the index; and
    an agent, operating under control of the processing resources, configured to cause execution of client application tasks associated with transaction requests asynchronously in responding to received transaction requests, each client application task having a respective task structure including a respective task identifier, wherein the agent is further configured to:
        receive a first command to temporarily halt pending client application tasks and, responsive thereto, cause the processing resources to control at least a part of the computing system to at least store task-related key-value pairs for the halted pending client application tasks, the keys in the task-related key-value pairs corresponding to task identifiers and the values in the task-related key-value pairs corresponding to serialized blobs of the respective task structures; and receive a second command and, responsive thereto, cause the processing resources to control at least a part of the computing system to deserialize the blobs of the respective task structures to create corresponding runtime tasks.

16. The system of claim 15, wherein the second command is issued following execution of one or more system management tasks.

17. A method of accessing data in a database, the method comprising:

having data and at least one key associated therewith, the data being indexed in an index based on the at least one key, the index providing key-value pairs in which keys in the key-value pairs correspond to the at least one key associated with the data and values in the key-value pairs correspond to deserializable serialized blobs generated to include the data in variant data type format, the variant data type format including different possible equivalent representations of the data such that the data stored in the blobs is of potentially different structures;

responsive to a request received from a computing device, facilitating, via processing resources including at least one processor and a memory, a database transaction on the data in connection with the index and based on the received request, wherein the request involves an update to the database;

identifying a key associated with the update;

accessing the blob corresponding to the value associated with the identified key, using the index;

deserializing the accessed blob to provide the variant type format data therein;

updating the variant type format data in accordance with the transaction request;

re-serializing the updated variant type format data to re-encode the re-serialized updated variant type format data into an updated blob; and storing the updated blob to the database.

18. The method of claim 17, wherein the index is stored in memory and/or the database is stored on a non-transitory computer readable storage medium.

19. The method of claim 17, wherein the at least one key associated with the data is a task identifier and the data includes task structures related to tasks to be performed in connection with the system, the tasks being identifiable using the task identifiers.

20. The method of claim 19, wherein the tasks are client application tasks associated with transaction requests and are unrelated to system management tasks.

21. The method of claim 17, further comprising executing client application tasks associated with transaction requests asynchronously in responding to received transaction requests, each client application task having a respective task structure including a respective task identifier.

22. The method of claim 17, wherein at least some of the blobs include data organized in accordance with nested schemas.

23. A method of accessing data in a database, the method comprising:

having data and at least one key associated therewith, the data being indexed in an index based on the at least one key, the index providing key-value pairs in which keys in the key-value pairs correspond to the at least one key associated with the data and values in the key-value pairs correspond to deserializable serialized blobs generated to include the data in variant data type format, the variant data type format including different possible equivalent representations of the data such that the data stored in the blobs is of potentially different structures; and responsive to a request received from a computing device, facilitating, via processing resources including at least one processor and a memory, a database transaction on the data in connection with the index and based on the received request;

executing client application tasks associated with transaction requests asynchronously in responding to received transaction requests, each client application task having a respective task structure including a respective task identifier;

receiving a first command to temporarily halt pending client application tasks and, responsive thereto, storing task-related key-value pairs for the halted pending client application tasks, the keys in the task-related key-value pairs corresponding to task identifiers and the values in the task-related key-value pairs corresponding to serialized blobs of the respective task structures; and receiving a second command and, responsive thereto, deserializing the blobs of the respective task structures to create corresponding runtime tasks.

24. The method of claim 23, wherein the second command is issued following execution of one or more system management tasks.

25. A non-transitory computer readable storage medium including a computer program executable by processing resources including at least one processor to perform operations comprising:

receiving, from a computing device, a transaction request, the transaction request relating to a database that includes data and at least one key associated therewith, the data in the database being indexed in a separate index based on the at least one key, wherein the request involves an update to the database, the index providing key-value pairs in which keys in the key-value pairs correspond to the at least one key associated with the data and values in the key-value pairs correspond to deserializable serialized blobs generated to include the data in variant data type format, the variant data type format including different possible equivalent representations of the data such that the data stored in the blobs is of potentially different structures;

facilitating a database transaction on the data in connection with the index and based on the received transaction request;

identifying a key associated with the update;

accessing the blob corresponding to the value associated with the identified key, using the index;

deserializing the accessed blob to provide the variant type format data therein;

updating the variant type format data in accordance with the transaction request;

re-serializing the updated variant type format data to re-encode the re-serialized updated variant type format data into an updated blob; and storing the updated blob to the database.

* * * * *